(12) United States Patent
Aoki

(10) Patent No.: US 6,542,298 B1
(45) Date of Patent: Apr. 1, 2003

(54) METHOD FOR MANUFACTURING A POLARIZATION BEAM SPLITTER

(75) Inventor: Kazuo Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 09/594,699

(22) Filed: Jun. 16, 2000

(30) Foreign Application Priority Data

Jun. 21, 1999 (JP) .............................................. 11-173932

(51) Int. Cl.$^7$ ................................................ G02B 5/30
(52) U.S. Cl. .................... 359/483; 359/484; 359/487; 359/494; 353/20; 356/326; 369/44.14; 369/112.16
(58) Field of Search ................................. 359/483, 484, 359/487, 494; 353/20; 356/326; 369/44.14, 112.16

(56) References Cited

U.S. PATENT DOCUMENTS 5,777,975 A  *  7/1998  Horinouchi et al. ........ 369/112

FOREIGN PATENT DOCUMENTS

| JP | 10 090520 | 4/1998 | |
| JP | 10 325954 | 12/1998 | |
| JP | 02000298213 A | * | 10/2000 |

* cited by examiner

Primary Examiner—Audrey Chang
Assistant Examiner—Craig Curtis
(74) Attorney, Agent, or Firm—Oliff & Berridge PLC

(57) ABSTRACT

The invention provides a cutting step of a polarization beam separating material less susceptible to cutting position slipping. In particular, the present invention relates to a method for manufacturing a polarization beam splitter for splitting an incident beam into two types of linearly polarized beams. A laminate is constructed by gluing a plurality of substrates, at least some of which have a polarization beam separating film on one surface thereof. The planar laminate of the substrate is cut at a predetermined angle to the surface thereof to form a generally planar polarization beam splitter block in which a plurality of prisms are glued, each having a parallelogrammatic shape in cross section. A rectangular parallelepiped polarization beam splitter is thus formed by cutting away a prism portion having a generally trapezoidal shape in cross section from at least one end portion of the polarization beam splitter block. The width across the top surface of the generally trapezoidal form of the cross section of the cut portion is set to be larger than half the width of a toothed blade.

18 Claims, 8 Drawing Sheets

(A) PREPARATION OF SUBSTRATES (B) ALIGNMENT (A) CURING OF OPTICAL ADHESIVE (B) CUTTING

METHOD FOR MANUFACTURING A POLARIZATION BEAM SPLITTER

BACKGROUND OF THE INVENTION

1. Field of Invention

The present invention relates to a method for manufacturing a polarization beam splitter.

2. Description of Related Art

Compact polarization beam splitters have been employed in an apparatus using a particular polarized beam, such as a projector employing a liquid-crystal display apparatus. FIG. 9 is a perspective view showing such a polarization beam splitter. The polarization beam splitter 70 has a structure having triangular and square prisms 71, 73, and 74, between which a polarization beam separating film 75 and a reflective film 76 are alternately sandwiched. The polarization beam separating film 75, constructed of an inorganic multilayer, is arranged between the prism 71 and the prism 73. The reflective film 76, constructed of an aluminum multilayer or an inorganic multilayer film, is arranged between the prism 73 and the prism 74. When a randomly polarized beam 77 is incident on the prism 72, the beam 77 is split into a P-polarized light component and an S-polarized light component. The P-polarized light component is transmitted through the polarization beam separating film 75 and then the prism 71 and exits outwardly. The S-polarized light component 78 is reflected from the polarization beam separating film 75, enters the prism 73, is reflected from the reflective film 76, and then exits outwardly. The polarization beam splitter 70 has the function of splitting the incident beam into two types of linearly polarized beams. With a wavelength film arranged on the exit surface of the polarization beam splitter, a polarizing beam converter for aligning the two types of polarized beams into one type of polarized beam is constructed. The polarizing beam converter is used in an apparatus handling a particular polarized beam to increase the utilization of light.

The polarization beam splitter 70 shown in FIG. 9 is manufactured in a method shown in FIG. 10. A planar polarization beam splitter block 70a having a generally parallelogrammatic shape in cross section is first manufactured. The polarization beam splitter block 70a has a structure in which a plurality of prisms are glued to each other, each having a parallelogrammatic shape in cross section. The prisms on both ends of the block are cut to form a triangular prim, thereby forming a rectangular parallelepiped polarization beam splitter. Such a cutting step is required because the rectangular parallelepiped shape is easy to assemble into an optical apparatus such as a projector.

In the cutting step, the polarization beam splitter block 70a to be cut is fixed to a support stand. The cutting step is performed by bring a toothed blade close to the polarizing beam splitter block to the side thereof opposite to the support stand. The cutting operation may be conveniently performed from the same side of the block regardless of which end of the block is cut.

If the block is cut from the same side as shown in FIG. 10, the toothed blade must cut into an edge of the parallelogram in cross section on one end of the polarization beam splitter block (the left end in FIG. 10). Such a cutting operation is subject to a cutting path slipping toward the ramp of the parallelogram as the cutting is in progress.

SUMMARY OF THE INVENTION

The present invention provides a cutting method of a polarization beam separating material which suffers from less cutting path slipping. Specifically, a laminate is constructed by gluing a plurality of substrates, at least some of which have a polarization beam separating film on one surface thereof. The planar laminate of the substrate is cut at a predetermined angle to the surface thereof to form a generally planar polarization beam splitter block in which a plurality of prisms are glued, each having a parallelogrammatic shape in cross section. A generally rectangular parallelepiped polarization beam splitter is thus formed by cutting away a prism portion having a generally trapezoidal shape in cross section from at least one end portion of the polarization beam splitter block.

In this embodiment, the prism portion having a generally trapezoidal shape in cross section is cut away from one end portion of the planar polarization beam splitter block in which the plurality of prisms are glued to each other, each having a parallelogrammatic shape. For this reason, the toothed blade is allowed to cut into a flat portion of the planar polarization beam splitter block during the cutting operation. This arrangement reduces the possibility of slipping the cutting path. Because of its generally rectangular parallelepiped shape, the polarization beam splitter is easy to assemble in a diversity of apparatuses.

Preferably, the width across the upper surface of the cut portion having the generally trapezoidal shape in cross section is larger than half the thickness of a toothed blade. With this arrangement, the outward face of the toothed blade comes inside the edge of the surface of the polarization beam splitter block. The effect of reducing the possibility of slipping the cutting path of the toothed blade is further increased.

In the step for forming the laminate, the thickness of, at least, one of the two outermost substrates of the laminate is larger than the thickness of one substrate glued between the two outermost substrates, and in the step for cutting away a prism portion having a generally trapezoidal shape in cross section, the cut portion is preferably cut from the outermost substrate of the laminate having the larger thickness.

When the laminate is cut to form the polarization beam splitter block, the outermost substrate of the laminate forms a prism of the end of the polarization beam splitter block. With this arrangement, the cross-sectional area of the end prism is enlarged. In the third step, the prism having a generally trapezoidal shape is cut away.

In the step for cutting the prism having a generally trapezoidal shape, the two ends of the polarization beam splitter block are cut, and the toothed blade cuts from one side of the planar polarization beam splitter block.

With the above arrangements, a simple cutting facility works. Specifically, placing the polarization beam splitter block upside down during the cutting operation is not necessary. There is no need for a facility which is equipped with toothed blades on both sides of the polarization beam splitter block. By sending the same toothed blade twice in different positions, the two end portions are cut away from the polarization beam splitter block. In the step for cutting the two end portions of the polarization beam splitter block, the toothed blade cuts into in the vicinity of the edge where the end face and the top surface of the polarization beam splitter block intersect. In such a case, there is a possibility that the cutting position of the toothed blade slips toward the end face. With the arrangement of the present invention, however, the toothed blade cuts into the top surface of the prism having the trapezoidal shape, and the possibility of slipping the cutting path is low.

The present invention can be embodied in the following diverse aspects, for example:

(1) A manufacturing apparatus for manufacturing a polarization beam splitter.

(2) A manufacturing method for manufacturing a polarization bean splitter.

(3) A computer program for operating the manufacturing apparatus or carrying out the manufacturing method.

(4) A storage medium for storing the computer program which operates the manufacturing apparatus or carries out the manufacturing method.

(5) A data signal, including the computer program which operates the manufacturing apparatus or carries out the manufacturing method, and modulated by a carrier wave.

DETAILED DESCRIPTION OF PREFERRED EMBODIMENTS

A. Embodiment

Figure 1:
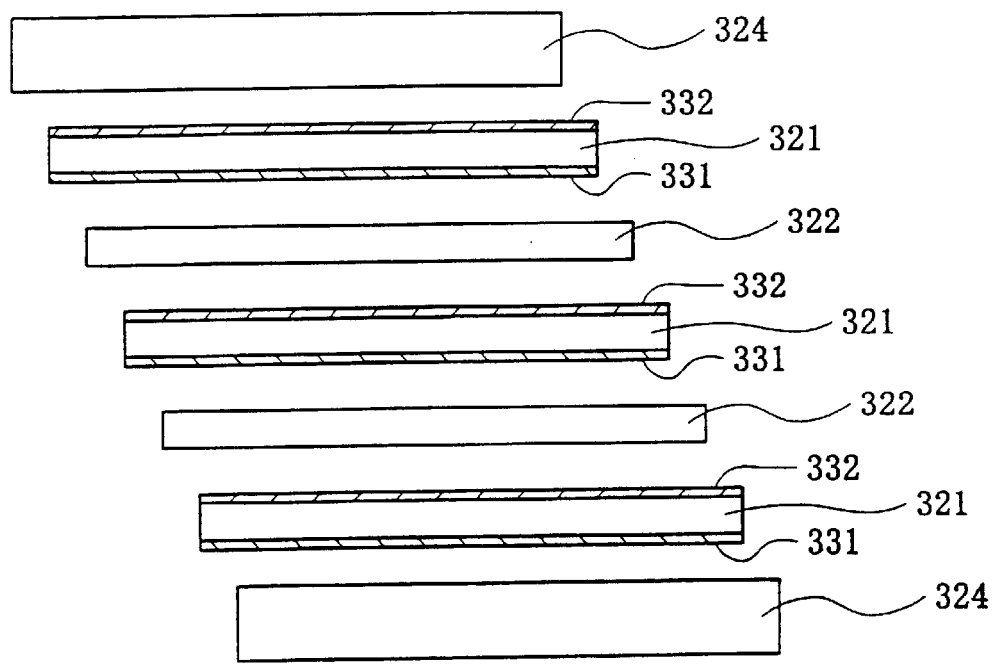
FIGS. 1(A) and 1(B) are sectional views showing a major processing step for manufacturing the polarization beam splitter array of one embodiment of the present invention.
Figure 1:
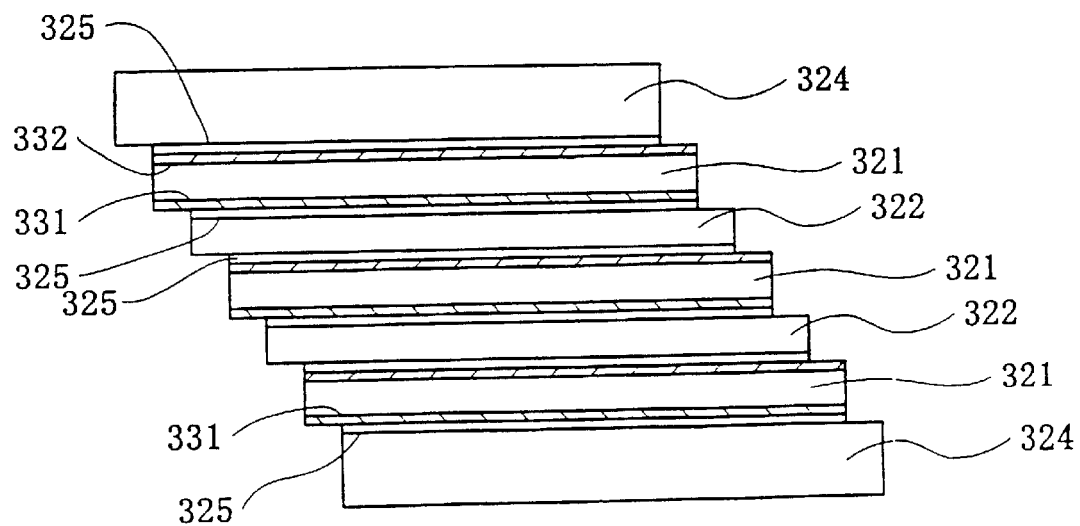

The embodiments of the present invention are now discussed.

(1) Manufacture of a Polarization Beam Splitter Array

FIGS. 1(A), 1(B), 2(A) and 2(B) are cross sectional views showing major processing steps for manufacturing a polarization beam splitter array of a first embodiment of the present invention. In a processing step shown in FIG. 1(A), a plurality of first planar light-transmissive members 321, a plurality of second planar light-transmissive members 322, and a dummy glass substrate 324 are prepared. A polarization beam separating film 331 is formed on one of the two substantially parallel surfaces (a film-forming surface) of each of the first light-transmissive members 321. A reflective film 332 is formed on the other of the two substantially parallel surfaces of each of first light-transmissive members 321. Neither of these films are formed on the surfaces of the second light-transmissive members 322 and the dummy glass substrate 324.

Sheet glass is used for the first and second light-transmissive members 321 and 322. Alternatively, a light-transmissive planar material other than glass may be employed. The first light-transmissive members may have a color different from that of the second light-transmissive members. With this arrangement, two members are easily recognized after the manufacturing of the polarization beam splitter is completed. For instance, one member may be constructed of colorless transparent sheet glass, while the other member may be constructed of blue transparent sheet glass. The sheet glass is preferably float glass, and more preferably polished sheet glass.

The polarization beam separating film 331 selectively transmits one of an S-polarized beam and a P-polarized beam while reflecting the other of the beams. The polarization beam separating film 331 is typically manufactured by laminating multiple dielectric layers having such a property.

The reflective film 332 is manufactured by laminating multiple dielectric layers. The dielectric multilayer forming the reflective film 332 has a composition and construction different from those of the multilayer forming the polarization beam separating film 331. The reflective film 332 is preferably constructed of a dielectric multilayer which selectively reflects only a linearly polarized light component (either P-polarized light or S-polarized light) reflected from the polarization beam separating film 331, while not reflecting other linearly polarized light component.

The reflective film 332 may be manufactured by depositing aluminum. When the reflective film 332 is manufactured of a dielectric multilayer, the reflective film 332 can reflect a particular polarized light component (S-polarized, for instance) at a reflectance of approximately 98%. The aluminum film presents a modest reflectance as high as 92%. With the reflective film 332 manufactured of the dielectric multilayer, the light quantity output by the polarization beam splitter array is increased. Furthermore, since the dielectric multilayer suffers from less light absorption than the aluminum film, heat generated is small. To increase a light reflectance on a particular linearly polarized beam, the dielectric multilayers of the reflective film 332 are optimized in thickness or film material (typically, two types of films are alternately laminated).

On the other hand, the dummy glass substrate 324 is a flat sheet glass having neither polarization beam separating film nor reflective film thereon. The dummy glass substrate 324 is a member forming an end portion of the polarization beam splitter, and the thickness thereof is set to be greater than those of the first and second light-transmissive members 321 and 322.

In the processing step shown in FIG. 1(B), the first and second light-transmissive members 321 and 322 are alternately glued to each other using an optical adhesive, and the dummy glass substrates 324 are respectively glued on the top layer and the bottom layer. As a result, optical adhesive layers 325 are formed between the substrates, one between the dummy glass substrate 324 and the reflective film 332, one between the polarization beam separating film 331 and the second light-transmissive member 322, one between the second light-transmissive member 322 and the reflective film 332, and one between the polarization beam separating film 331 and the dummy glass substrate 324. Referring to FIGS. 1(A), 1(B), 2(A) and 2(B), the thicknesses of the layers 331, 332, and 325 are exaggerated for clarity, and the number of sheets of glass shown is not real.

Figure 2:
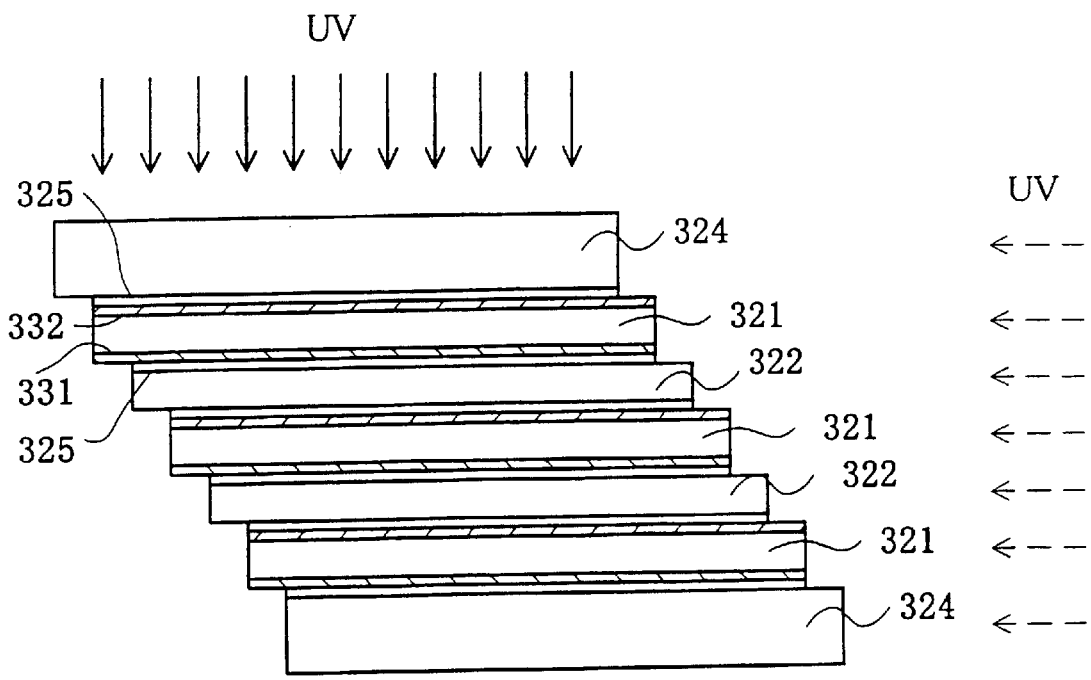
FIGS. 2(A) and 2(B) are sectional views showing a major processing step for manufacturing the polarization beam splitter array of one embodiment of the present invention.
Figure 2:
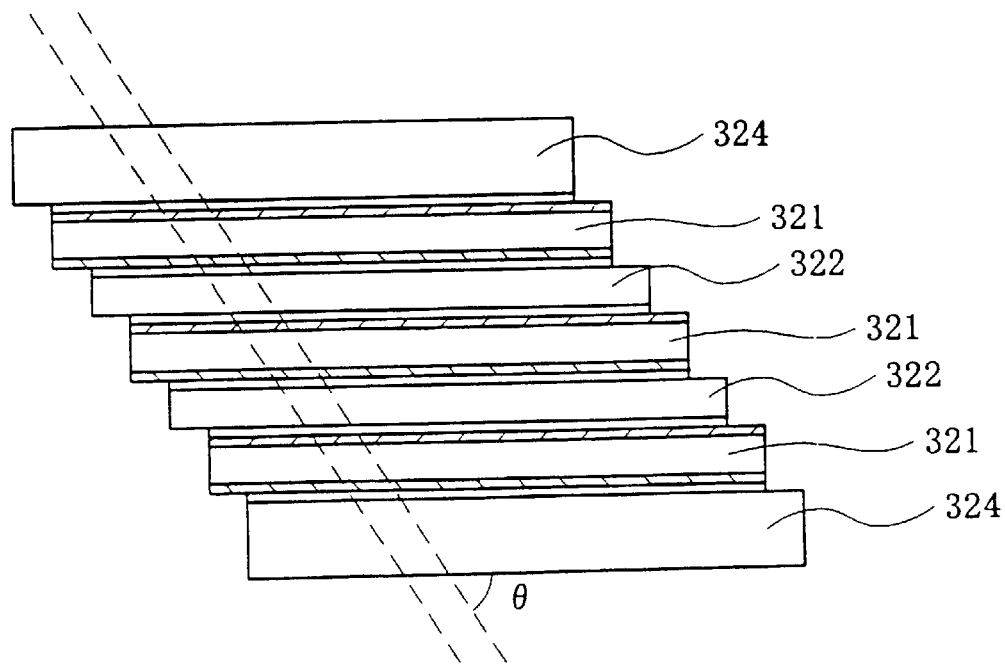

In the processing step shown in FIG. 2(A), ultraviolet light is irradiated from substantially vertical direction to the surfaces of the glued light-transmissive members 321 and 322 and the dummy glass substrates 324 to cure the optical adhesive layers 325. The ultraviolet light is transmitted through the dielectric multilayer. In this embodiment, the polarization beam splitter film 331 and the reflective film 332 are respectively manufactured of a dielectric multilayer. As shown in FIG. 2(A), the plurality of the optical adhesive layers 325 are concurrently cured by projecting ultraviolet light from substantially vertical direction to the light-transmissive members 321 and 322 and the dummy glass substrates 324 as shown in FIG. 2(A).

When aluminum is deposited onto the reflective film 332, the ultraviolet light is reflected from the aluminum film. In this case, the ultraviolet light is projected in a direction substantially parallel to the surfaces of the light-transmissive members 321 and 322 as represented by arrow-headed broken lines in FIG. 2(A). On the portion of the laminate opposite to the light incident side, the irradiation efficiency of the ultraviolet light to the optical adhesive layers 325 drops. It takes a relatively long time for the optical adhesive layer 325 to fully cure. If the reflective film 332 is manufactured of a dielectric multilayer, the ultraviolet light is projected normally to the surfaces of the light-transmissive members 321 and 322 rather than in parallel the surfaces thereof, and the optical adhesive layers 325 efficiently cure in a relatively short time. The laminate is manufactured in this way. A different method may be employed for this processing step as long as the plurality of the substrates are glued, at least some of which have a polarization beam separating film thereon.

In the processing step shown in FIG. 2(B), the laminate, composed of the plurality of the light-transmissive members 321 and 322 and the dummy glass substrates 324 thus glued, is cut along two substantially parallel cutting planes (represented by broken lines) having a predetermined angle q to the surface thereof. An optical element block (polarization beam splitter block) 320' is thus cut. The value q is preferably approximately 45 degrees. The angle q governs the angle the polarization beam separating film 331 and the reflective film 332 make with a light incident surface 320i and a light exit surface 320o in the polarization beam splitter array.

Figure 3:
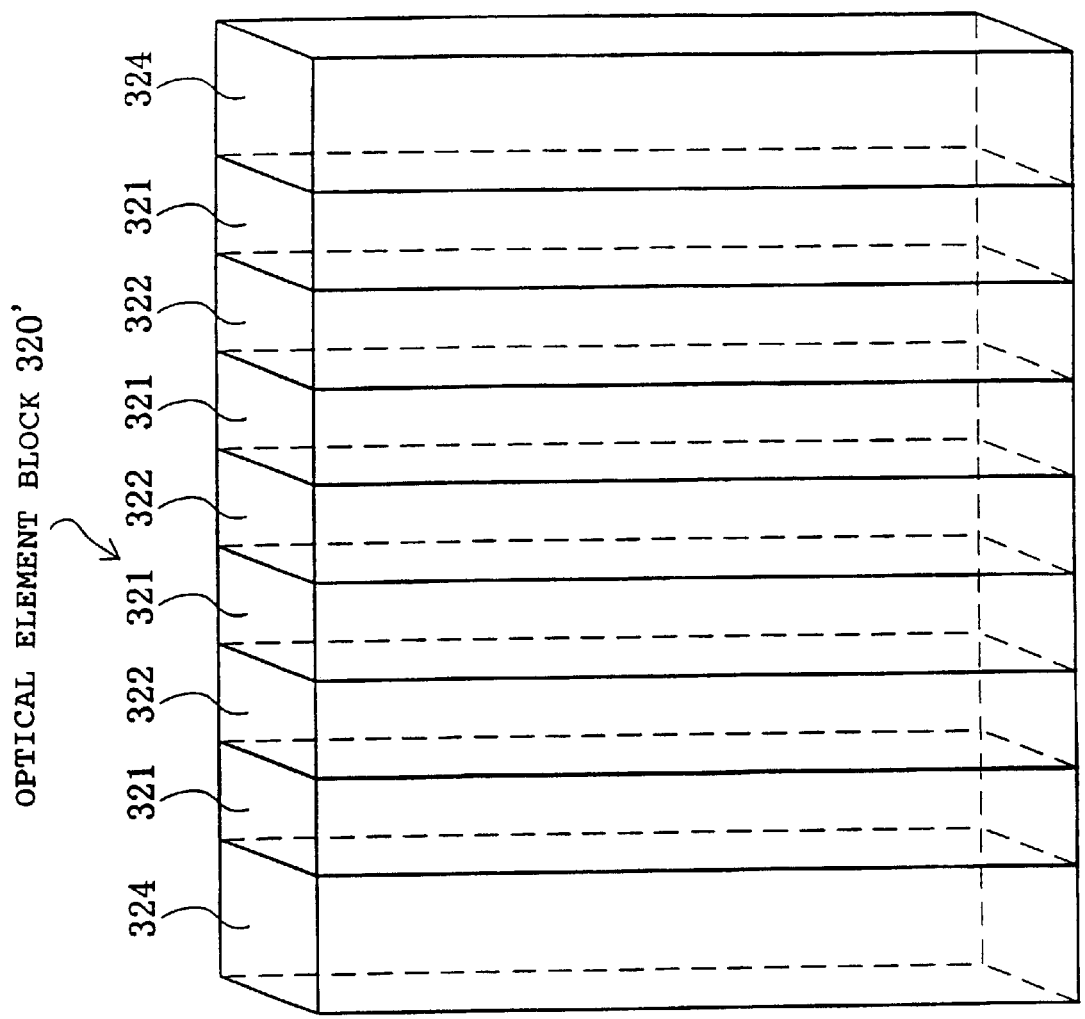
FIG. 3 is a perspective view showing the optical element block of the embodiment.

FIG. 3 is a perspective view of the optical element block 320' thus constructed. As shown, the optical element block 320' has a construction in which the first and second light-transmissive members 321 and 322, each having a parallelogrammatic shape in cross section, are alternately glued. Glued on both ends of the laminate are the dummy glass substrates 324 having a parallelogrammatic shape in cross section and having a thickness larger than those of the first and second light-transmissive members 321 and 322. The end portions of the optical element block 320' having an acute-angle edge are cut away to form a rectangular parallelepiped, and the surfaces thereof (cut surfaces) are polished. A polarization beam splitter array thus results.

The optical element block 320' is a generally planar optical element block which includes a polarization beam splitter section (corresponding to the periodic structure composed of the first and second light-transmissive members in this embodiment) having mutually parallel light incident surface and light exit surface and splitting a beam incident on the light incident surface, and a cut portion (corresponding to the dummy glass substrate in this embodiment), having a first surface and a second surface, respectively coplanar with the light incident surface and the light exit surface, and arranged at least on one end of the polarization beam splitter section. In this embodiment, the dummy glass substrates are arranged on both ends of the optical element block. Alternatively, the dummy glass substrate may be arranged on only one end of the optical element block.

(2) Cutting of the Two End Portions of the Polarization Beam Splitter Array

Figure 4:
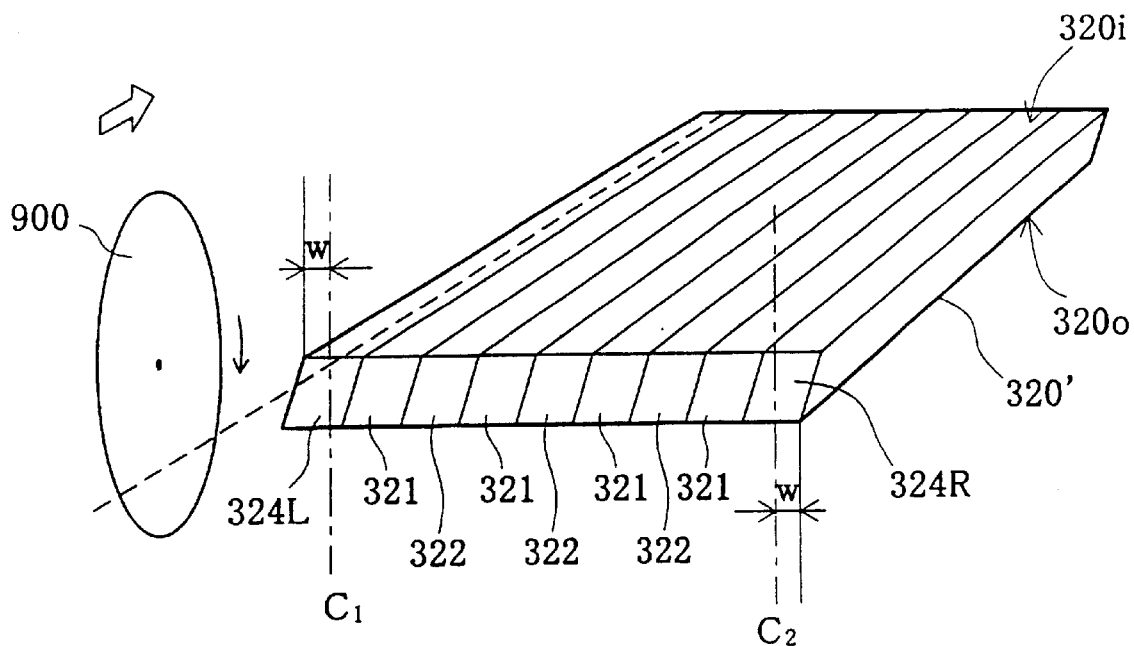
FIG. 4 is a view explaining a processing step for machining vertical end faces of the optical element block shown in FIG. 3 by cutting the two end portions thereof.

FIG. 4 is a view explaining the processing step which cuts the two end portions of the optical element block 320' to form vertical surfaces on both ends thereof. The cut optical element block 320' is a substantially planar thin member having a generally parallelogrammatic shape in cross section. A polarization beam splitter 320 (FIG. 5) is obtained by vertically cutting away the acute-angle edge portions of the optical element block 320' having the parallelogrammatic shape in cross section, in normal to the top and bottom surfaces thereof, i.e., in normal to the light incident surface 320i and the light exit surface 320o. The processing step is performed by twice passing a single toothed blade disk 900 having teeth thereabout across the optical element block 320' in a direction parallel to the interfaces of the periodic structure (namely, in the longitudinal direction of the prisms). The two end portions of the optical element block 320' may be cut by passing a pair of toothed blade disks, arranged on the same side of the optical element block 320', across the optical element block 320', rather than by passing twice a single toothed blade disk.

The rotary shaft of the toothed blade 900 is positioned above the top surface of the optical element block 320' rigidly glued onto the support stand, namely, above the light incident surface 320i. The toothed blade 900 cuts into the optical element block 320' from the light incident surface 320i. The cutting position of the toothed blade 900 to the left-end dummy glass substrate 324L is set so that the center of the thickness of the toothed blade 900 is positioned at a distance W inwardly from the edge of the light incident surface 320i. The distance W is longer than half the thickness of the toothed blade 900, and is 10 mm in this embodiment. The cutting position of the toothed blade 900 to the right-end dummy glass substrate 324R is set so that the center of the thickness of the toothed blade 900 is positioned at a distance W inwardly from the edge of the light exit surface 320o. As a result, the portion cut by the toothed blade 900 has a trapezoidal cross section with two opposing surfaces coplanar with the light incident surface 320i and the light exit surface 320o and the outer surface of the dummy glass substrate 324 as a ramp. The width across the top surface of the trapezoidal shape (the narrower one of the two parallel and opposing surfaces) is {W−(thickness of the toothed blade 900)/2}, because the optical element block 320' is cut by the toothed blade 900 by the thickness thereof.

Figure 5:
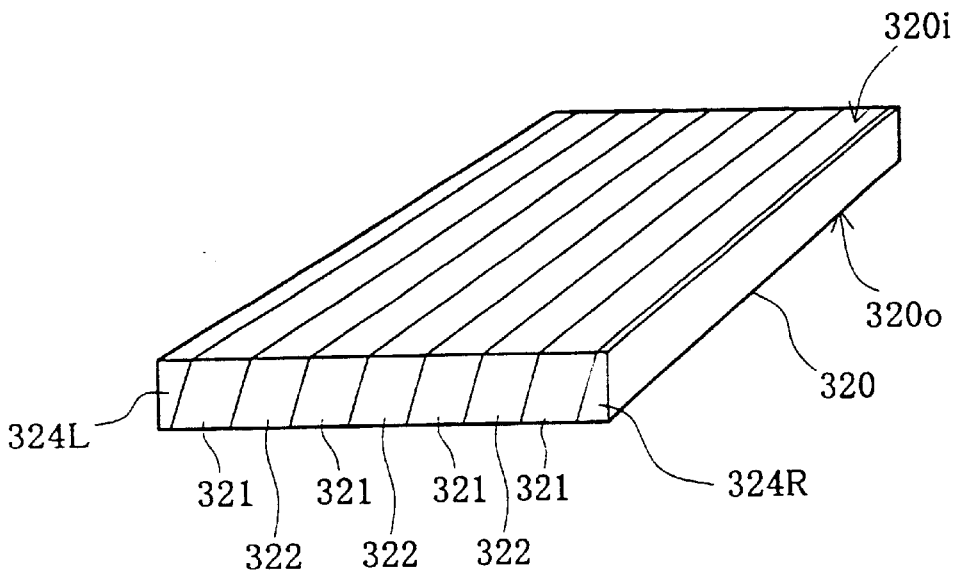
FIG. 5 is the perspective view of a polarization beam splitter array.

The light incident surface 320i and the light exit surface 320o of the cut optical element block 320' are respectively polished for flatness. FIG. 5 is a perspective view showing the polarization beam splitter array 320 thus constructed.

(3) Advantages of the Embodiment

In this embodiment, the polarization beam splitter array 320 is produced by cutting away the two end portions of the planar optical element block 320' having a parallelogrammatic shape in cross section. The generally rectangular parallelepiped polarization beam splitter array 320 thus constructed is conveniently assembled into an optical apparatus such as a projector.

In this embodiment, the toothed blade 900 cuts into the polarization beam splitter array 320 from the same side thereof. The two end portions of the polarization beam splitter array 320 are cut away by causing the toothed blade 900 to twice travel. On one end portion, the toothed blade 900 cuts into the polarization beam splitter array 320 in the vicinity of the edge having an obtuse angle in cross section, where the end face (originally the surface of the dummy glass substrate 324L) and the top surface (the light incident surface 320i) intersect. In such a setup, the cutting path of the toothed blade 900 is subject to slipping toward the end face because of the presence of the edge having the obtuse angle in cross section where the two faces intersect. In this embodiment, however, the cutting position of the toothed blade 900 is inwardly shifted from the edge of the light incident surface 320i with the center of the thickness of the toothed blade 900 positioned at a predetermined distance W from the edge of the light incident surface 320i. In this arrangement, the toothed blade 900 is allowed to cut into the light incident surface 320i on the flat portion thereof of the polarization beam splitter array 320. There is little possibility that the cutting position is slipped toward the end face. Since the toothed blade 900 cuts with the material of the polarization beam splitter array 320 present on both sides thereof, without any unbalanced pressure from one side only, the toothed blade 900 is unlikely to skew in the cutting path thereof. For the same reason, the toothed blade 900 is less susceptible to unsymmetrical wear. In this embodiment, the center of the thickness of the toothed blade 900 is internally positioned by 10 mm from the edge of the light incident surface 320i. The cutting position of the toothed blade 900 is not limited to this and may be any position deeper inside from the edge than by {thickness of the toothed blade 900)/2}. Specifically, the toothed blade 900 cuts into the dummy glass substrate 324L (portion to be cut) at a position deeper inside from the edge of the polarization beam splitter array 320 by a predetermined distance.

Since each of the two end portions has a trapezoidal shape in cross section, the top surface or the bottom surface (the wider one of the two parallel and opposing surfaces) remains in contact with the support stand which secures the polarization beam splitter block. If the area of the portion to be cut in contact with the support stand is large enough, in other words, if the cutting position of the toothed blade 900 is deep inside enough from the edge, the cut portion stays put on the support stand, without being dispersed, after the cutting operation. This arrangement reduces the possibility of the occurrence of the cracks or defects along the cutting planes.

Since the outermost dummy glass substrate 324 of the laminate is thicker than the first and second light-transmissive members 321 and 322, the size in the cross section of the end prism of the polarization beam splitter block is larger than those of the other prisms. For this reason, the prism portion to be cut, having a generally trapezoidal shape in cross section, is thus easily cut. The polarization beam splitter film 331 and the reflective film 332 are intact and away from the cutting plane, and are entirely free from being accidentally cut.

In accordance with the above-referenced manufacturing method, the sheet glass having thereon the polarization beam separating film composed of the inorganic multilayer thin film and the sheet glass having thereon the reflective film are alternately glued to form the laminate. The laminate is cut at the predetermined angle to the surface thereof. In this way, the periodic structure of the polarization beam separating films and the reflective films in the polarization beam splitter is adjusted by changing the thickness of and the number of the sheet glass substrates. Specifically, a thin polarization beam splitter is produced by a number of thin glass substrates. The degree of parallelization of each layer is determined by the accuracy of the sheet glass. A high degree of parallelization is thus easily obtained. The accuracy of periodic pitch in the polarization beam separating surface and the reflecting surface can be enhanced. Furthermore, since the light incident surface and the light exit surface are uniform, the processing of these surface, such as deposition of a wavelength film or an antireflection film may be easily carried out.

To form the laminate, the following method may be used in the alignment of the first light-transmissive members 321, the second light-transmissive members 322, and the dummy glass substrates 324. Produced is a plurality of laminates, each of which, referred to as a unit laminate, is formed by laminating a single first light-transmissive member 321 and a single second light-transmissive member 322. The unit laminates are successively stacked one on another, and the dummy glass substrates 324 are respectively glued onto the top and bottom layers. Alternatively, a single laminate is produced using an adhesive layer, bubbles therewithin are evacuated, and then the adhesive layer is cured by directing ultraviolet light. This method also provides advantage similar to those of the previously described method.

The thickness accuracy of the light-transmissive members 321 and 322 is controlled in the polishing step of these surfaces. The thickness of the adhesive layer is made uniform by applying uniform adhesive agent and uniform pressure on the surfaces thereof in the evacuation of bubbles.

Figure 6:
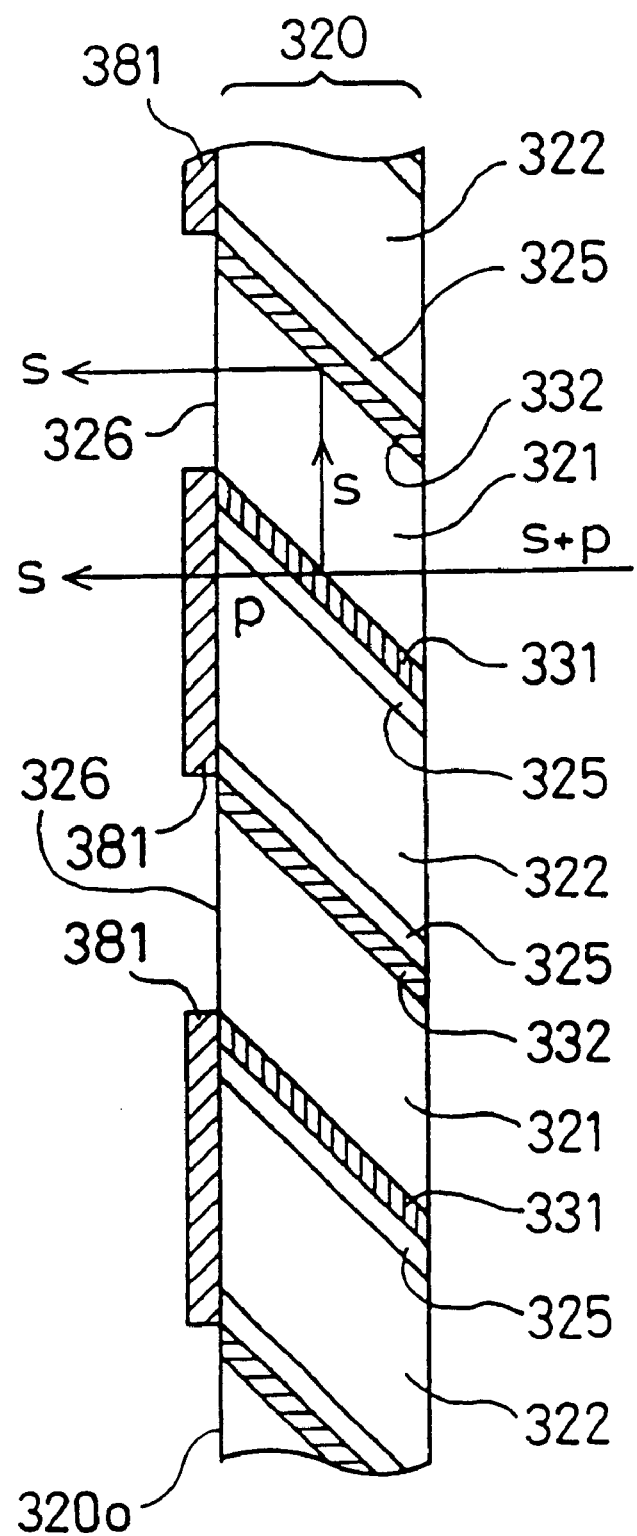
FIG. 6 is a sectional view showing the polarizing beam converter element of the embodiment.

B. Optical Element of a Projector that Incorporates the Polarization Beam Splitter Array of the Embodiment A projector incorporating the polarization beam splitter array of the embodiment is now discussed. FIG. 6 is a sectional view showing a polarizing beam converter element in which half-wavelength films 321 are selectively arranged on the light exit surface 320o of the polarization beam splitter array 320 of this embodiment.

A randomly polarized beam, having an S-polarized light component and a P-polarized light component, is incident on the light incident surface of the polarizing beam converter element of the embodiment shown in FIG. 6. The incident beam is then split by the polarization beam separating film 331 into an S-polarized beam and a P-polarized beam. The S-polarized beam is reflected off the polarization beam separating film 331 and bent at substantially at a right angle, and is again reflected from the reflective film 332, and exits from a light exit surface 326. On the other hand, the P-polarized beam is simply transmitted through the polarization beam separating film 331, then converted into an S-polarized beam through the half-wavelength film 381, and exits from the exit surface 326. The polarizing beam converter element thus selectively outputs the S-polarized beam only.

With the half-wavelength films 381 selectively arranged on the output surface of the first light-transmissive member 321, the polarizing beam converter element may output a P-polarized beam only.

In the polarization beam splitter array 320 of the embodiment shown in FIG. 6, the P-polarized beam, transmitted through the polarization beam separating film 331, is once transmitted through the optical adhesive layer 325 between the light incident surface and the light exit surface of the polarization beam splitter array 320. The S-polarized beam, reflected from the polarization beam separating film 331, is not transmitted at all through the optical adhesive layer 325 between the light incident surface and the light exit surface of the polarization beam splitter array 320. Although the optical adhesive layer 325 is substantially transparent, it still has a property of absorbing light. Each time a beam is transmitted through the optical adhesive layer 325, the light strength of the beam is weakened. Furthermore, the polarization direction of the beam may be slightly changed when being transmitted through the optical adhesive layer 325. In the polarization beam splitter array of this embodiment, the number of times the S-polarized beam is transmitted through the optical adhesive layer 325 is small, and a high utilization of light thus results.

Figure 7:
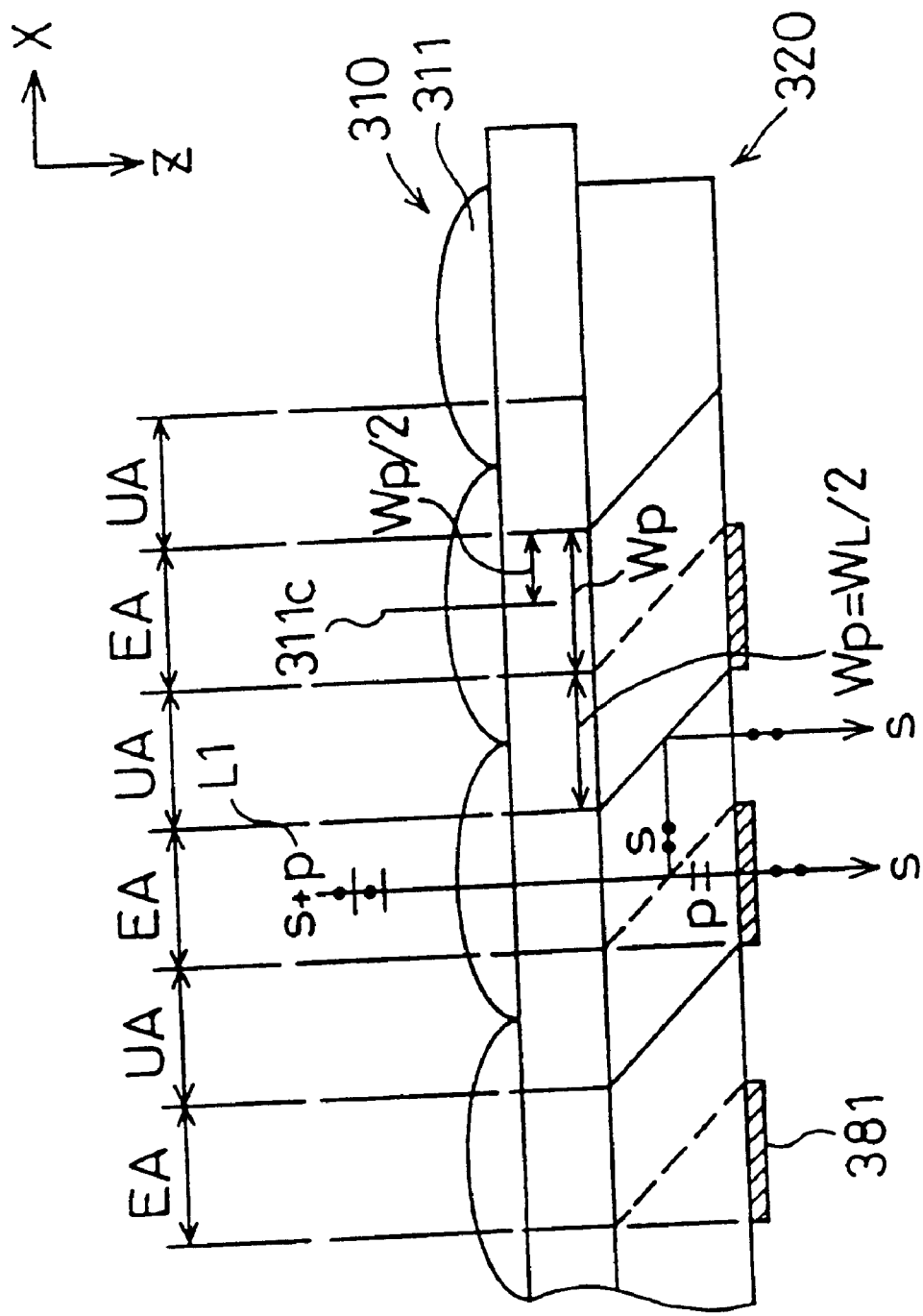
FIG. 7 is a cross-sectional view showing the polarization beam splitter array, which has, on the light incident surface thereof, a condenser lens array of a matrix of microlenses (condenser lenses)

FIG. 7 is a cross-sectional view showing the polarization beam splitter array 320, which has, on the light incident surface thereof, a condenser lens array 310 of a matrix of microlenses (condenser lenses) 311. Alternately arranged on the light incident surface are effective light incident areas EA (the light incident surface corresponding to the polarization beam separating film 331) through which a beam is incident on the polarization beam separating film 331 and is converted into an effective polarized beam, and ineffective light incident areas UA (the light incident surface corresponding to the reflective film 332) through which a beam is incident on the reflective film 332 and converted into an ineffective beam. The size Wp of the effective light incident area EA and the ineffective light incident area UA in the x direction is equal to half the size WL of the condenser lens 311 in the x direction. The center 311c (the optical axis of the lens) of the condenser lens 311 is aligned with the center of the effective light incident area EA in the x direction. The effective light incident area EA corresponds to the area to which the polarization beam separating film 331 is projected onto the light incident surface of the polarization beam splitter array 320. The pitch of the polarization beam separating films 331 in the x direction is set to be equal to the pitch of the optical axes 311c of the condenser lenses 311.

The right end condenser lens 311 in FIG. 7 has neither corresponding polarization beam separating film 331 nor reflective film 332. The quantity of light transmitted through the end condenser lens 311 is relatively small, and the utilization of light is not very much influenced even if no corresponding films are arranged.

Figure 8:
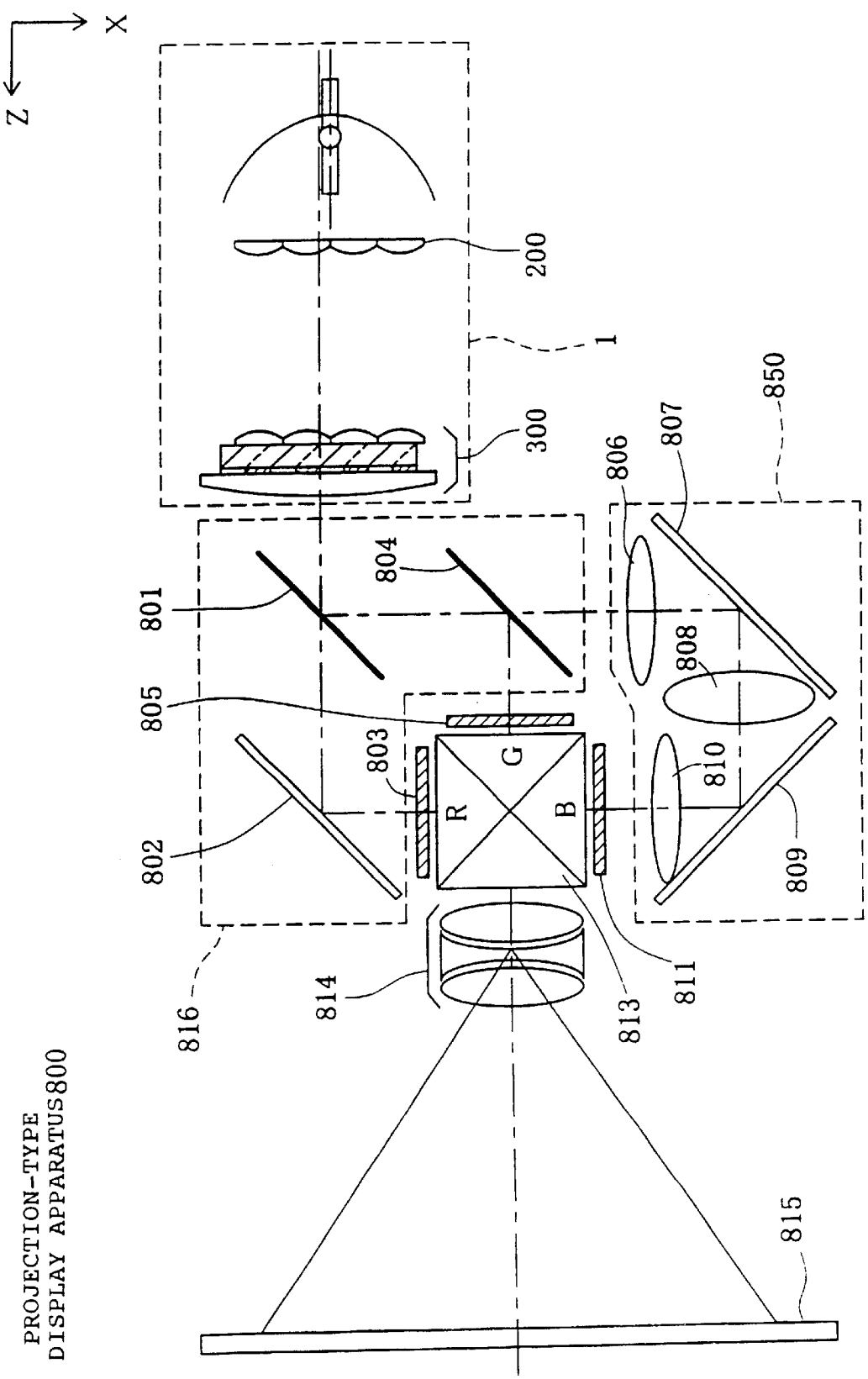
FIG. 8 is a general block diagram of the projector having the illumination system.
Figure 9:
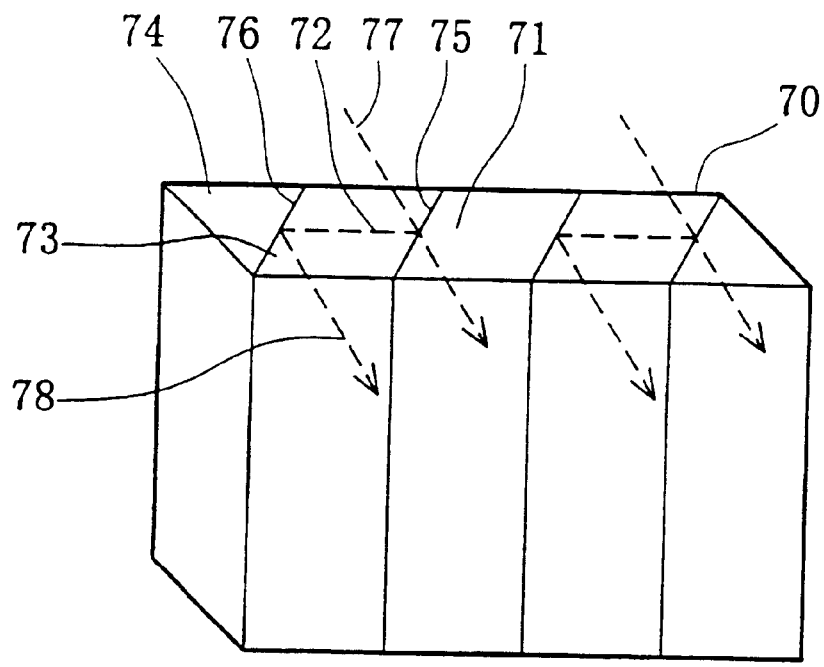
FIG. 9 is a perspective view showing the polarization beam splitter.
Figure 10:
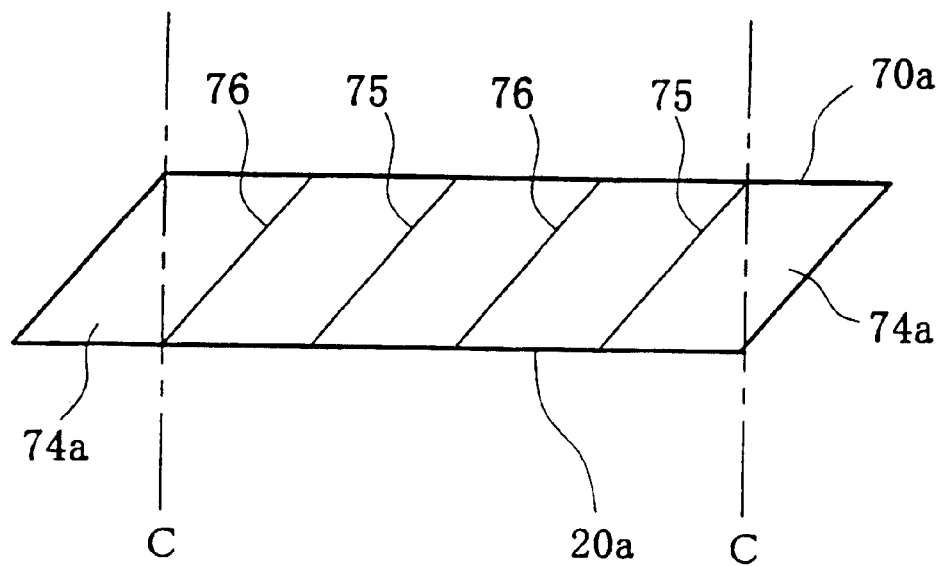
FIG. 10 is a view explaining the conventional process step for cutting the two end portions of the polarization beam splitter array to form a vertical end face.

FIG. 8 is a general block diagram showing one example of the projector that implements the present invention. The projector 800 includes an illumination optical system 1, a color separation optical system 816, a relay optical system 850, three liquid-crystal light valves 803, 805, and 811, a cross-dichroic prism 813, and a projection optical system 814.

The illumination optical system 1, including a polarizing beam generating optical system, outputs a linearly polarized beam of a single type having the same polarization. The beam, output from the illumination optical system 1, is color-separated into red (R), green (G), and blue (B) beams through the color separation optical system 816. The color beams are respectively modulated through the liquid-crystal light valves 803, 805, and 811 corresponding to image information. Each of the liquid-crystal light valves 803, 805, and 811 includes a liquid-crystal display panel, namely an electrooptical device, and polarizers arranged on the light incident side and the light exit side thereof. The color beams, respectively modulated through the liquid-crystal light valves 803, 805, and 811, are synthesized through the cross-dichroic prism 813, and are projected onto a screen 815 through the projection optical system 814. In this way, an image is projected onto the screen 815.

In the projector 800, the illumination optical system 1 includes a first optical element 200 and a second optical element 300. The first optical element 200 includes a plurality of rectangular beam splitting lenses 201 for splitting a luminous flux. The first optical element 200 is arranged so that the center of the first optical element 200 is aligned with an optical axis R of a light source.

The second optical element 300 includes the condenser lens array 310, the polarization beam splitter array 320 of this embodiment, a selective wavelength film 380, and an lens 390. The selective wavelength film 380 includes half-wavelength films 381 mounted on the light exit surface of the second light-transmissive member 322 only. The light exit surface of the first light-transmissive member 321 is a transparent planar portion. Because of the generally rectangular parallelepiped thereof, the polarization beam splitter array 320 is easy to be assembled into the apparatus, and a high accuracy is easily assured in the installation of the polarization beam splitter array 320. Since the polarization beam splitter array 320 is less susceptible to cracks and defects in the processing steps thereof, and is manufactured at a high machining accuracy, the projector projects a high-quality image on screen.

The construction and the function of the projector shown in FIG. 8 are detailed in Japanese Unexamined Patent Application Publication No. 10-90520 and Japanese Unexamined Patent Application Publication No. 10-325954, both filed by the same applicant of this application, and are not discussed here.

C. Modifications

The present invention is not limited to the above embodiments, and various changes are possible without departing from the scope of the present invention. For instance, the following changes may be possible.

In the above embodiments, the polarization beam splitter is constructed of the sheet glass. The present invention is not limited to the sheet glass. Alternatively, other transparent substrate, such as an optical glass or plastic may be employed.

In these embodiments, the two end portions of the polarization beam splitter array within the distance W from the edge thereof are cut away. In the cutting operation of one of the two end portions (the right-end portion shown in FIG. 4), in which the toothed blade does not cut in the vicinity of the edge, the distance to the cutting position from the edge may be shortened. In this way, the shapes of the right-end and left-end prisms of the polarization beam splitter array are different and the light incident surface and the light exit surface are easily identified. The material to be cut away is thus reduced. In the cutting operation of one of the two end portions, in which the toothed blade does not cut in the vicinity of the edge, the distance W may be set to be zero, and the portion to be cut away has a triangular shape in cross section. The material to be cut away is even more reduced.

What is claimed is:

1. A method for manufacturing a polarization beam splitter for splitting an incident beam into two types of linearly polarized beams, comprising:

forming a laminate by gluing a plurality of substrates, at least some of which have a polarization beam separating film on one surface thereof;

cutting the laminate at a predetermined angle to the surface of the substrate to form a generally planar polarization beam splitter block in which a plurality of prisms are glued, each having a parallelogrammatic shape in cross section; and forming a generally rectangular parallelepiped polarization beam splitter by cutting away a prism portion having a generally trapezoidal shape in cross section from at least one end portion of the polarization beam splitter block.

2. The method for manufacturing a polarization beam splitter according to claim 1, the width across the upper surface of the cut portion having the generally trapezoidal shape in cross section being larger than half the thickness of a toothed blade.

3. The method for manufacturing a polarization beam splitter according to claim 1, the thickness of at least one of the two outermost substrates of the laminate being larger than the thickness of one substrate glued between the two outermost substrates in the laminate forming step.

4. The method for manufacturing a polarization beam splitter according to claim 3, the cut portion being cut from the outermost substrate of the laminate having the larger thickness in the step of forming a generally rectangular parallelepiped polarization beam splitter.

5. The method for manufacturing a polarization beam splitter according to claim 1, the two end portions of the polarization beam splitter block being cut in the step forming a generally rectangular parallelepiped polarization beam splitter.

6. The method for manufacturing a polarization beam splitter according to claim 5, the toothed blade cutting through the planar polarization beam splitter block from one side thereof.

7. The method for manufacturing a polarization beam splitter according to claim 2, the two end portions of the polarization beam splitter block being cut in the step forming a generally rectangular parallelepiped polarization beam splitter.

8. The method for manufacturing a polarization beam splitter according to claim 7, the toothed blade cutting through the planar polarization beam splitter block from one side thereof.

9. The method for manufacturing a polarization beam splitter according to claim 3, the two end portions of the polarization beam splitter block being cut in the step forming a generally rectangular parallelepiped polarization beam splitter.

10. The method for manufacturing a polarization beam splitter according to claim 9, the toothed blade cutting through the planar polarization beam splitter block from one side thereof.

11. The method for manufacturing a polarization beam splitter according to claim 4, the two end portions of the polarization beam splitter block being cut in the step forming a generally rectangular parallelepiped polarization beam splitter.

12. The method for manufacturing a polarization beam splitter according to claim 11, the toothed blade cutting through the planar polarization beam splitter block from one side thereof.

13. A method for manufacturing a polarization beam splitter for splitting an incident beam into two types of linearly polarized beams, comprising:

forming a laminate by gluing a plurality of substrates, at least some of which have a polarization beam separating film on one surface thereof;

cutting the laminate at a predetermined angle to the surface of the substrate to form a generally planar polarization beam splitter block in which a plurality of prisms are glued, each having a parallelogrammatic shape in cross section; and forming a generally rectangular parallelepiped polarization beam splitter by cutting away a prism portion having a generally trapezoidal shape in cross section from at least one end portion of the polarization beam splitter block, the width across the upper surface of the cut portion having the generally trapezoidal shape in cross section being larger than half the thickness of a toothed blade, the thickness of at least one of the two outermost substrates of the laminate being larger than the thickness of one substrate glued between the two outermost substrates in the laminate forming step.

14. The method for manufacturing a polarization beam splitter according to claim 13, the cut portion being cut from the outermost substrate of the laminate having the larger thickness in the step of forming a generally rectangular parallelepiped polarization beam splitter.

15. The method for manufacturing a polarization beam splitter according to claim 13, the two end portions of the polarization beam splitter block being cut in the step forming a generally rectangular parallelepiped polarization beam splitter.

16. The method for manufacturing a polarization beam splitter according to claim 15, the toothed blade cutting through the planar polarization beam splitter block from one side thereof.

17. The method for manufacturing a polarization beam splitter according to claim 14, the two end portions of the polarization beam splitter block being cut in the step forming a generally rectangular parallelepiped polarization beam splitter.

18. The method for manufacturing a polarization beam splitter according to claim 17, the toothed blade cutting through the planar polarization beam splitter block from one side thereof.

* * * * *